(No Model.)
N. TALARD.
Brake Apparatus for Vehicles.
No. 239,571. Patented March 29, 1881.
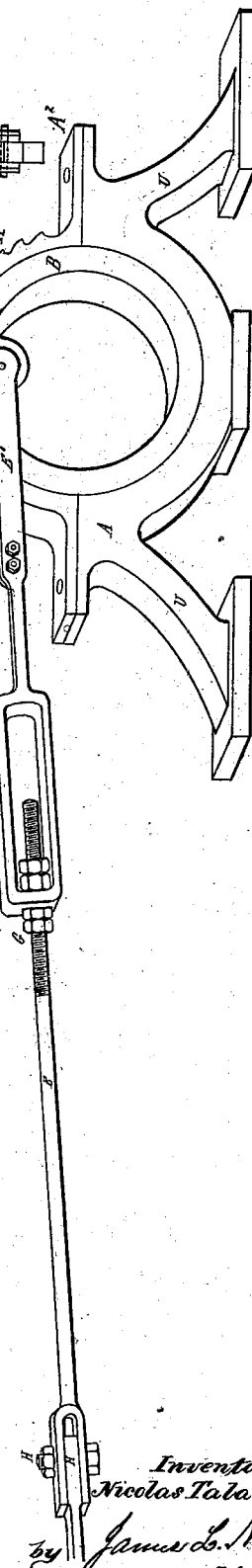
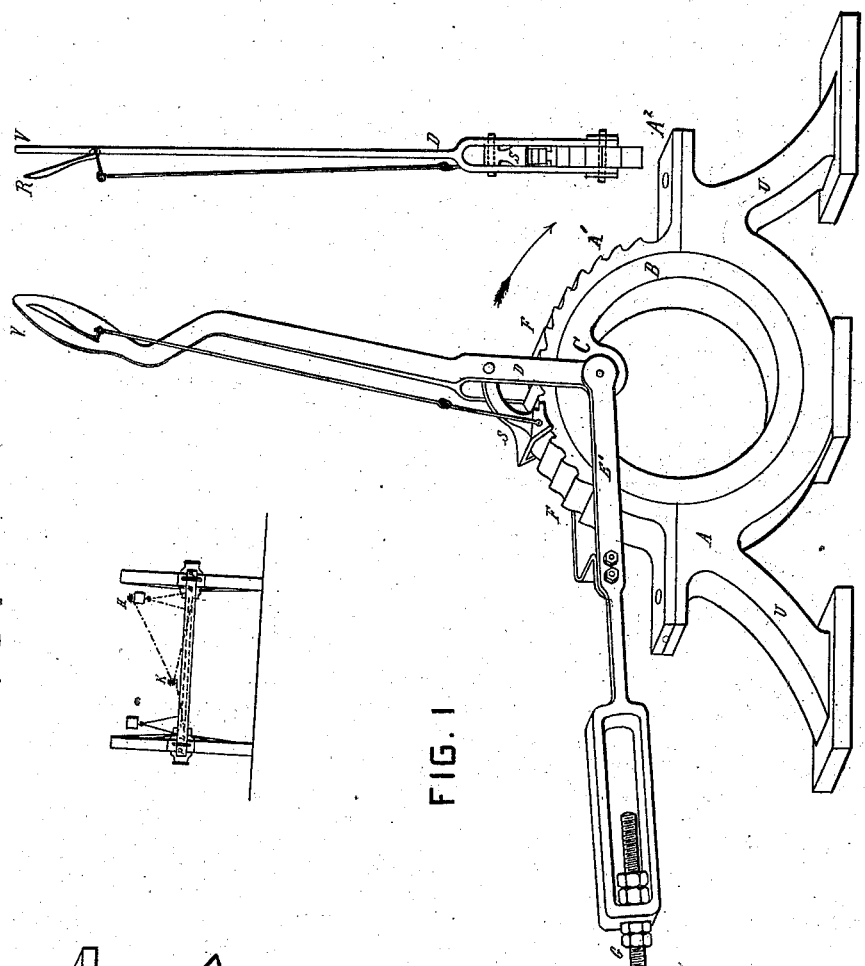
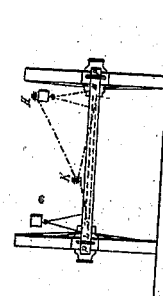
Witnesses
J. A. Rutherford
Robert Evartt
Inventor
Nicolas Talard.
by James L. Norris
Atty

UNITED STATES PATENT OFFICE.

NICOLAS TALARD, OF PARIS, FRANCE.

BRAKE APPARATUS FOR VEHICLES.

SPECIFICATION forming part of Letters Patent No. 239,571, dated March 29, 1881.

Application filed February 23, 1881. (No model.) Patented in France August 25, 1877, and in England December 14, 1880.

*To all whom it may concern:*

Be it known that I, NICOLAS TALARD, a citizen of France, residing at Paris, in the Republic of France, have invented an Improved Brake Apparatus for Vehicles, (for which I have obtained a patent in Great Britain, No. 5,227, bearing date 14th December, 1880, and in France, bearing date 25th August, 1877,) of which the following is a specification.

According to my present invention the rod or bar by which the brakes are applied in vehicles is connected to a point in a ring or half-ring at some distance from its center, the said ring being capable of rotation in a circular seat, so as by its eccentric action relative to its connection with the brake-rod to put a tension upon the brake-rod, and thus apply the brakes with considerable force. The rotation of the ring may be effected either by a lever with ratchet and pawl or by a worm.

Figure 1 of the drawings shows the side elevation, in perspective, of the apparatus arranged to be actuated by a lever with ratchet and pawl. Fig. 2 is a perspective view of the lower half of the frame in which the ring is arranged. Fig. 3 is a front view of the operating hand-lever, the pawl, and the ratchet; and Fig. 4 is a diagram showing the manner of applying the invention to the vehicle.

A A' is a frame made in two halves, of which the lower one, A, is fixed to the vehicle by feet U, while the upper half, A', is secured to A by flanges A². In this frame is formed a circular seat for the ring B, which is capable of revolving with slight friction therein, the seat being somewhat hollowed out, as shown in the perspective view of A at Fig. 2, in order to retain the ring B within it, the outer surface of this being rounded in a corresponding manner. The ring B has a boss, at C, through which passes a square pin, upon the projecting square parts of which is fitted the fork of a lever, D, having corresponding square eyes. The pin has cylindrical extensions beyond the lever, and upon such extensions is pivoted the fork E' of the brake-rod E. The upper part, A', of the frame has ratchet-teeth F, into which takes a pawl, S, pivoted to the lever, and connected by a rod to a bell-crank lever, R, pivoted to the handle V of the lever D, as shown more clearly in the front view of the lever at Fig. 3. When it is desired to move the lever D the lever R is brought against the handle V by the hand, whereby the pawl is drawn out of gear.

From the above-described arrangement it will be seen that if in order to apply the brakes the lever D be pulled in the direction of the arrow, the ring B will thereby be turned in the same direction in its seat, drawing the rod E E' with it; and, owing to the point of attachment of the rod E E' being at a shorter distance from the center of motion than the periphery of the ring, this will operate with considerable power to apply the brakes, the action being as though the ring B were an eccentric mounted on the end of the rod E E', and turning in a fixed strap, A, instead of the strap being attached to the rod E and the eccentric B being made to revolve on a fixed axis. It will be evident that the more the lever is moved over in the direction of the arrow the greater will be the power of the eccentric in applying the brakes and retaining them so applied. For releasing the brakes, the pawl S is raised out of gear with the ratchet-teeth and the handle is moved forward.

The rod E may be adjusted in length by having its screwed end connected by nuts G to the loop of the rod E E'.

Fig. 4 shows diagrammatically how the above-described apparatus can be applied to a vehicle.

H represents the attachment of the rod E, Fig. 1, to a rod or chain, H K, leading to a pin on the axle of the wheels, where it is connected to rods or chains K M from either end of the transverse bar carrying the brake-blocks P P, the bar being suspended by links from the body of the vehicle.

Having thus described the nature of my invention and in what manner the same is to be performed, I claim—

1. The combination, with a frame provided with an interior circular bearing, of the ring B, arranged to rotate in said bearing and connected at or near its periphery with the rod which actuates the brake, substantially as and for the purpose described.

2. The combination of the frame A A', ring B, lever D, with pawl S, taking into ratchet-teeth F, and brake-rod E, constituting a mechanism for applying the brakes of vehicles, substantially as herein described.

In testimony whereof I have signed my name to this specification, in the presence of three subscribing witnesses, this 3d day of February, A. D. 1881.

NICOLAS TALARD.

Witnesses:
JULES CHARLES EUGENE DUPONT,
JULES HENRI J. DIGEON,
PHILIP WALKER.